Dec. 10, 1946.  W. H. SILVER  2,412,362
POWER LIFT MECHANISM
Filed April 13, 1942  4 Sheets-Sheet 1

INVENTOR
WALTER H. SILVER
BY
ATTORNEYS

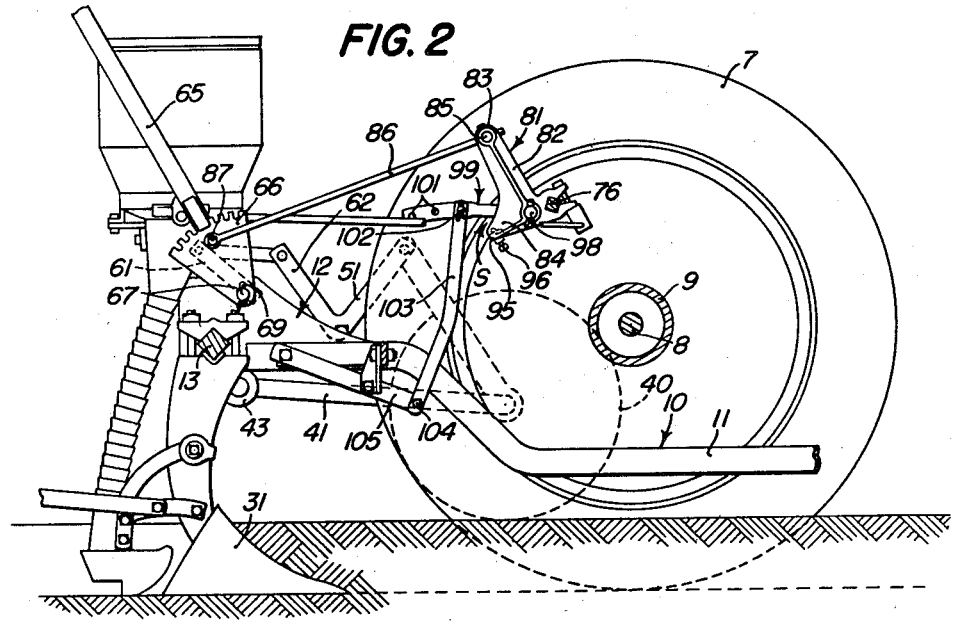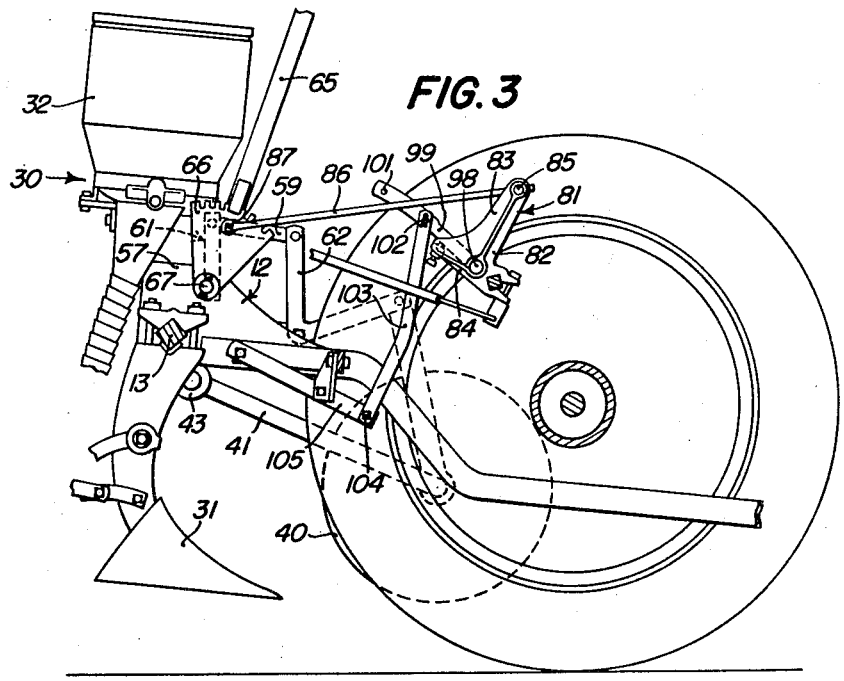

Dec. 10, 1946.     W. H. SILVER     2,412,362
POWER LIFT MECHANISM
Filed April 13, 1942     4 Sheets-Sheet 3
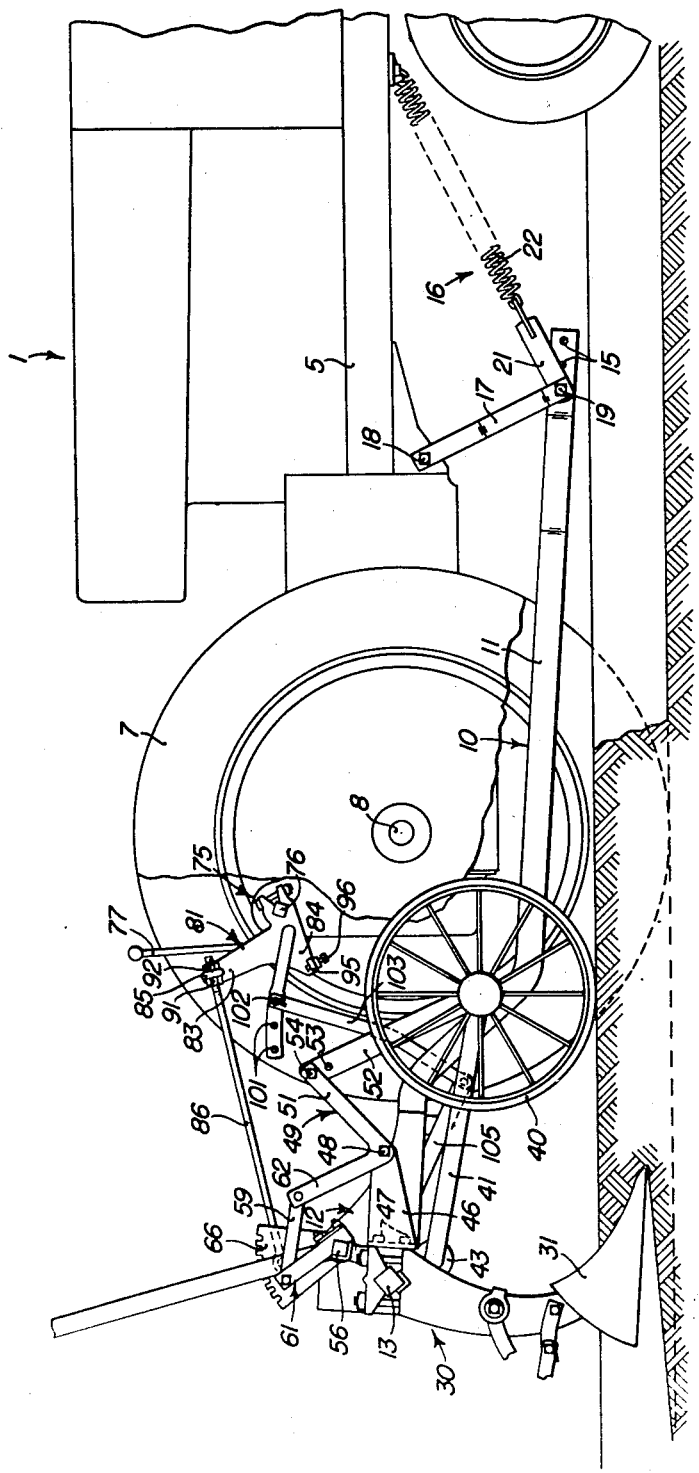
FIG. 4
INVENTOR
WALTER H. SILVER
BY
ATTORNEYS

INVENTOR
WALTER H. SILVER
BY
ATTORNEYS

Patented Dec. 10, 1946

2,412,362

UNITED STATES PATENT OFFICE 2,412,362

POWER LIFT MECHANISM

Walter H. Silver, Moline, Ill., assignor to Deere & Company, Moline, Ill., a corporation of Illinois Application April 13, 1942, Serial No. 438,862

17 Claims. (Cl. 97—50)

The present invention relates generally to agricultural implements and more particularly to implements in which the position of the operating unit or units is controlled by means on the tractor.

The object and general nature of the present invention is the provision of a tractor drawn bedder or lister connected with the tractor so that the position of the lister or bedder bottoms is controlled entirely from the tractor. More specifically, it is a feature of this invention to provide a tool frame having a pair of lateral rock shafts with which the gauge wheels are connected, the rock shafts being connected with the rock shaft of the tractor power lift whereby operation of the latter through one range of movement effects adjustments in the operating depth of the tools. Further, it is a feature of this invention to provide means whereby movement of the tractor power lift beyond said range serves to lift both the tool frame and the tools relative to the ground.

Another feature of this invention is the provision of an agricultural machine in which a yielding hitch is provided in connection with means responsive to yielding of the hitch for readjusting the operating depth of the associated tools. More particularly, it is a feature of this invention to provide means for decreasing the depth of penetration of the tools whenever the spring hitch yields under an abnormal pull. A further feature of this invention is the provision of an agricultural implement movably connected with the tractor and having tool means and gauge means, the latter being connected whereby if the tool means tends to run too deep the gauge means is automatically shifted an increased amount relative to the tool means, thus offsetting the tendency of the tool to run too deep. Likewise, it is a feature of this invention to provide an arrangement in which if the tools should run too shallow the weight of the gauging means and associated parts is added to the tools to aid in increasing the penetration thereof.

It is also a feature of this invention to provide means for controlling the gauge wheel from the tractor through linkage which accommodates the raising of the tool into inoperative position without affecting the position of the gauge means to any objectionable extent.

These and other objects and advantages of the present invention will be apparent to those skilled in the art after a consideration of the following detailed description, taken in conjunction with the accompanying drawings.

In the drawings:

Figure 2 is a sectional view taken generally along the line 2—2 of Figure 1 and showing the controlling connections between the tractor power lift and the gauge wheel rock shaft at one side of the tractor as well as the lifting connections between the tractor power lift and the tool frame, the parts being shown in operating position;

Figure 3 is a view similar to Figure 2, showing the parts in the position they occupy when the tool frame is raised into inoperative or transport position;

Figure 4 is a view illustrating the action of the gauge wheel linkage in acting automatically to maintain the tools at the desired depth of operation;

Figure 5:
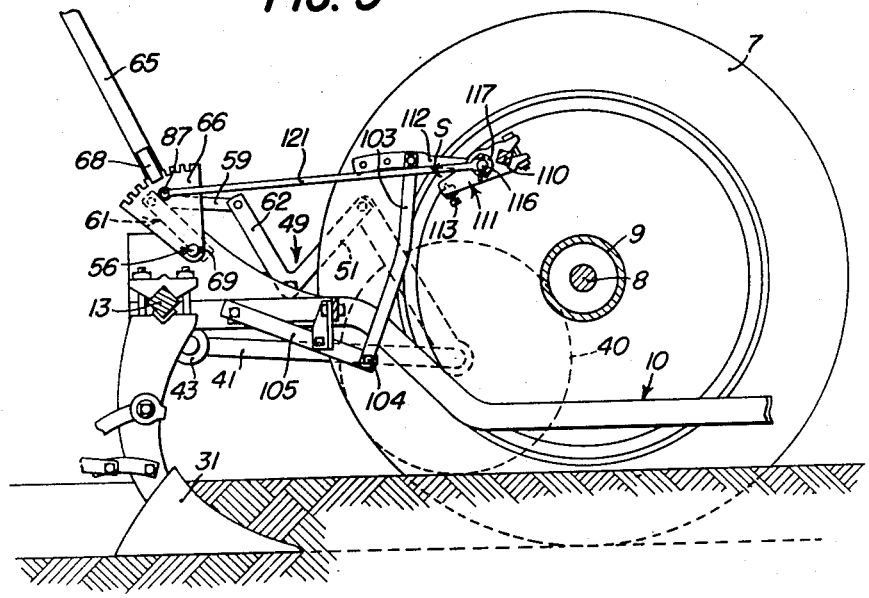
Figure 6:
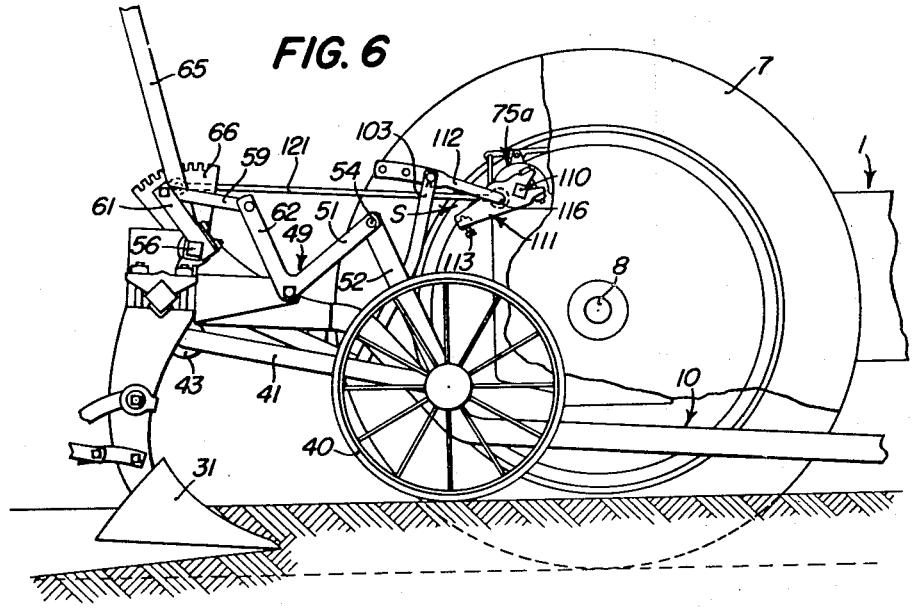

Figure 5 is a side view similar to Figure 4, showing an implement, constructed according to the principles of the present invention, connected with a tractor having a conventional type of power lift mechanism, in which the latter is not utilized for effecting depth adjustments but is used solely to raise or lower the implement; and Figure 6 is a view similar to Figure 5 showing the action of the connecting linkage in serving to automatically raise the tools upon the occurrence of excessive draft loads.

Figure 1:
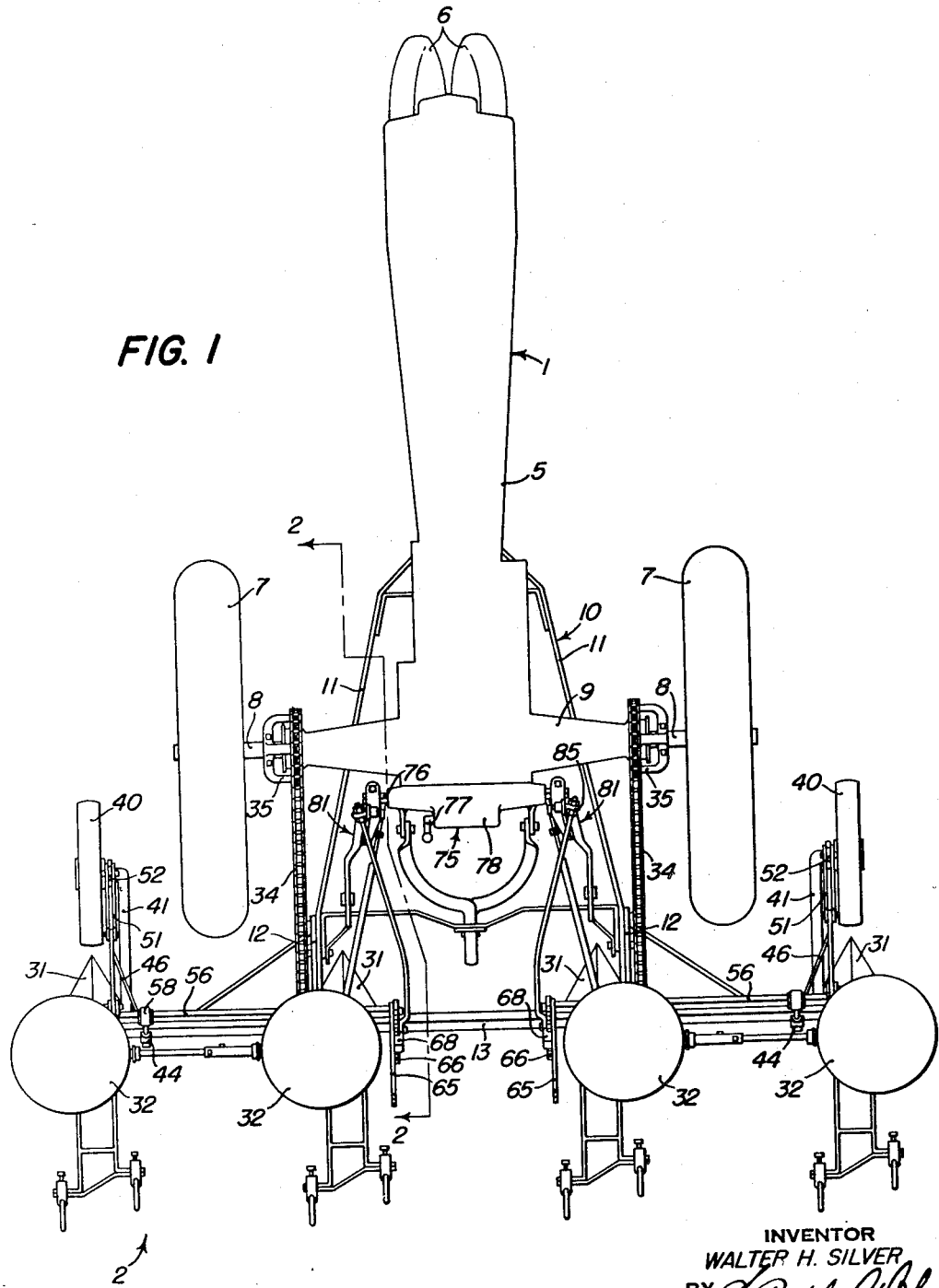
Figure 1 is a plan view of an implement incorporating the principles of the present invention.

Referring now to the drawings, more particularly to Figures 1 and 2, the reference numeral 1 indicates the tractor and the reference numeral 2 indicates the implement. The tractor 1 is of more or less conventional construction so far as the present invention is concerned, comprising means serving as a supporting or propelling frame, indicated at 5, supported on front steering wheels 6 and rear traction wheels 7. The latter are mounted on axle shafts 8 which are journaled within a rear axle housing 9, the latter including lateral extensions receiving the axle shafts 8. The implement 2 comprises a frame 10 which is similar to the implement shown in my prior patent Re. 21,266, dated November 14, 1939, to which reference may be made if necessary. The tool frame or tool beam 10 includes a pair of generally longitudinally extending beams or frame members 11 which at their rear ends are bolted or otherwise secured to plates 12 which are welded in laterally spaced relation to a rear transverse tool bar 13, the latter preferably extending laterally outwardly beyond beyond and in rear of the rear tractor wheels 7. The tool bars 11 converge forwardly and at the forward ends are connected together and are formed with a plurality of apertures 15. The implement frame 10 is connected with the forward portion of the tractor by a yielding hitch 16. The hitch 16 comprises a yoke 17 that is pivoted, as at 18, to the tractor and at its lower end carries a pivot bolt 19 which is disposed in one of the several openings 15. A pair of links 21 are also connected at their rear ends to the pivot bolt 19 and at their forward ends are connected to one or more cushioning springs 22. The latter are connected at the forward ends to the front end of the tractor, as shown in Figure 4. The cushioning springs 22 not only cushion the load but also serve as a safety device to prevent breakage of tractor and implement parts when field obstructions are encountered, the entire implement frame shifting generally rearwardly when the springs 22 yield under an abnormal pull.

Figures 1 and 2 show the implement arranged as a four-row sweep planter, in which case four units 30 are provided, each including a sweep tool 31 and a seed distributing means 32. The four units are arranged in pairs, and each pair is driven by a chain 34 trained over a sprocket 35 fixed to the associated axle shaft 8. Other tools may be mounted on the tool bar 13, as desired, and may be used with or without planting means. A pair of gauge wheels 40 is provided for the frame 10, and each of the gauge wheels 40 is mounted on the outturned forward end of a gauge wheel crank axle 41. The latter includes a laterally inturned end received for rocking movement in the lower portion of a bracket casting 43 which is clamped, as at 44, to the tool bar 13.

A bell crank supporting bracket 46 is secured by clamping means 47 to the tool bar 13 and includes a forward end that is apertured to receive a pivot bolt 48 on which a bell crank 49 is mounted for rocking movement. One arm 51 of the bell crank 49 is connected by a link 52 to the lower or forward end of the gauge wheel crank axle 41. The link 52 is provided with a plurality of openings 53 to receive a pivot bolt 54 by which the arm 51 is connected thereto in one of several different positions. Thus, rocking movement of the bell crank 49 serves to raise or lower the gauge wheel 40 relative to the frame 10. Each gauge wheel 40 is provided with the above-described linkage, and since one linkage is substantially the same as the other a description of only one is necessary.

The tool bar 13 supports a pair of rock shafts 56, one adjacent each side of the frame, by means of brackets 57 and 58. An arm 61 is fixed by any suitable means to each rock shaft 56 adjacent the laterally outer end thereof, and the arm is connected by a link 59 to the upper end of the other arm 62 of the bell crank 49.

The inner end of each rock shaft 56 extends inwardly beyond the associated bracket 57 and a hand lever 65 is secured, as by welding or the like, to the inner end of the rock shaft 56. A sector 66 is mounted for rocking movement on a reduced end 67 of the rock shaft 56 and is notched to cooperate with detent mechanism 68 carried by the hand lever 65. A pin 69 or the equivalent serves to maintain the sector 66 in place on the inner end of the shaft 56.

The tractor 1 is equipped with a hydraulic power lift mechanism, indicated in its entirety by the reference numeral 75, and since such mechanism does not per se form any part of the present invention the same is not described in detail. Briefly, the power lift unit 75 on the tractor 1 includes a transverse rock shaft 76 which, through a suitable control lever 77, may be moved and held in any one of a number of positions of adjustment or may be caused to swing into a lifted position, as desired. The power lift mechanism 75 is enclosed in a casing 78 from which the laterally outer ends of the power lift rock shaft 76 extend. Secured to each end of the rock shaft 76 is a lifting arm construction 81 which includes a bell crank lever 82 having a pair of arms 83 and 84. The arm 83 extends substantially upwardly when the implement is in operating position and is apertured to receive one end of a swivel pin 85 through which the forward end of a link or rod 86 extends. The rear end of the link 86 is pivotally connected, as at 87, with the sector 66. The forward end of the link or rod 86 is threaded to receive a pair of lock nuts 91 and 92 by which the effective length of the link 86 may be adjusted, as desired.

The other arm 84 of each bell crank 81 is provided with a threaded lug 95 in which a cap screw 96 is threaded. Also, each arm 84 is provided with an opening in which the laterally turned end 98 of a lifting arm 99 is disposed. The arm 99 is provided with a plurality of openings 101 to receive a pivot pin 102 by which the upper end of a lifting link 103 is connected in any position of adjustment to the arm 99. The lower end of the lifting link 103 is connected by a pivot pin 104 to a bar 105 that is connected rigidly to and forms a part of the implement frame 10. Each of the lifting arm constructions 81 is made as just described, and hence further description is unnecessary. It will be noted, particularly from Figure 2, that when the parts are in normal operating position there is appreciable space S between the upper end of the adjusting cap screw 96 and the adjacent portion of the lifting arm 99. The purpose of this arrangement is to permit the power lift arm 81 to swing through a considerable range of movement, so as to adjust the associated gauge wheel, without lifting the tool frame, as will be clear from the operation of the implement as described below.

In operation, the tools and tool frame are free for generally vertical swinging movement relative to the tractor about the hitch point 19, the tools normally being gauged for depth of operation by the position of the gauge wheels 40, for so long as the tool frame is in a given position relative to the tractor, the link 86, acting through the arm 61 and the rock shaft 56, holds the gauge wheel crank axle 41 in a given position, determined by the hydraulically locked position of the power lift rock shaft 76. As best shown in Figure 2, the gauge wheels 40 normally are quite close to the rear tractor wheels and therefore there is little tendency for the implement to swing vertically relative to the tractor even though the ground traversed may be quite uneven. However, it will be noted that the link 86 extends generally longitudinally, and therefore, the implement is capable of relatively free vertical movement with respect to the tractor without affecting the position of the gauge wheels relative to the tools. This is an important advantage, especially when traversing uneven ground, since variations in the position of the tractor will have practically no effect upon the depth of operation.

The position of the gauge wheels 40 relative to the tools is automatically varied, however, when the implement shifts generally longitudinally relative to the tractor, as by yielding of the springs 22 under abnormal load conditions. This result is secured through the arrangement of the linkage 86 and associated parts so that they automatically decrease the depth of operation if the draft pull should become excessive. The spring hitch unit 16 is adapted to yield under excessive forces, and in so yielding permits the frame 10 to shift rearwardly relative to the tractor. Such rearward shifting movement of the tool frame relative to the tractor causes the links 86 to exert a pull on the arms 61, thus rocking the rock shafts 56 in a clockwise direction (Figure 2) relative to the tool frame.

This acts to force the ground wheels 40 downwardly and to raise the tools a certain amount, depending upon the amount of yielding of the spring hitch. This materially aids the tools in passing over rocks or other obstructions that may be encountered under the ground surface since the effect of forcing the gauge wheels downwardly acts to raise the tools.

The depth of operation of the tools may be adjusted by actuating the power lift unit through its depth adjusting range so as to move the lifting arms 81 into any one of several positions, as desired, the rocking movement of the arms acting through the links 86 to swing the gauge wheels upwardly or downwardly as the case may be. Further, the power lift unit may be actuated to rock the arms 81 forwardly to their transport position, and the resulting pull exerted through the links 86 swings the rock shafts 56 in a clockwise direction (Figure 2) and first forces the gauge wheels 40 downwardly relative to the implement frame and then continued forward rocking movement of the arms 81 takes up the lost motion S, whereupon the screws 96 engage the lifting arms 99 so that further forward movement of the power lift arms 81 acts through the arms 99 and the links 103 to raise the tool frame together with the tools and the gauge wheels. As best shown in Figure 3, when the tools are raised into their transport position the gauge wheels 40 are held in substantially the same position for the forward movement of the arms 81 in lifting the tool frame 10 is compensated, so far as the position of the gauge wheels is concerned, by the fact that the pivots 87 thus move upwardly and slightly forwardly and this compensates for the forward movement of the links 86.

In Figures 5 and 6 is illustrated a modified form of the present invention in which the implement is connected with a tractor having a conventional type of power lift mechanism, such as the one shown in United States Patent No. 2,107,760, issued to McCormick et al., on February 8, 1938. In this form of the invention the implement per se is substantially the same as has been described above, and hence the same reference numerals have been employed for like parts. The conventional tractor power lift mechanism is indicated by the reference numeral 75a and includes a rock shaft 110 adapted to be rocked between a lowered position and a raised position at the will of the operator, but is not locked in any intermediate position. In Figures 5 and 6 the rock shaft 110 is shown in its lowered or operating position. Secured to each end of the rock shaft 110 is a lifting arm 111 in which an auxiliary arm 112 is pivoted. An adjustable set screw 113 is carried at the outer end of each of the arms 111 and is operative, like the mechanism shown in Figures 1-4 and described above, to engage the auxiliary lifting arms 112 to raise the implement into its raised or transport position. The lowered position of the arms 111 is such that there is an appreciable space S between each set screw 113 and the associated auxiliary arm 112, whereby the implement may rise and fall relative to the tractor when traversing uneven ground. Each of the auxiliary arms 112 includes a laterally inturned end 116 which is received in a sleeve section 117 formed on the associated arm 111. A link 121 is provided with an eye at its forward end and is pivoted on the laterally inturned end 116 of the associated auxiliary lifting arm 112. Each link 121 extends generally rearwardly and at its rear end is pivoted to the sector 66 at that side of the implement.

From this description it will be seen that the pair of links 121 extend from the implement to a relatively fixed point on the tractor, the laterally inturned end 116 being quite close to the axis of the rock shaft 110 so as to serve, in effect, as a relatively fixed point on the tractor. Since the rear ends of the links 121 are connected, when the lever 65 is latched to the sector 66, to swing the depth adjusting rock shaft 56, whenever the cushioning hitch springs 22 (Figure 4) yield as under excessive draft loads, the resulting generally rearward movement of the implement with respect to the tractor results in raising the tools automatically in proportion to the amount of yield of the springs 22. Figure 6 shows the positions of the several parts upon the occurrence of an excessive draft pull sufficient to cause the springs 22 to yield. It will be noted that in this form of the invention the depth adjustment is effected, not through the power lift, but by manipulation of the hand levers 65 which, in the form of the invention shown in Figures 1-4, serve more as means for equalizing the depth of the tools at one side of the implement with respect to the tools at the other side.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement adapted to be connected with and supported for transport on a tractor, comprising a tool support mounted for both vertical and longitudinal movement relative to the tractor, hitch means for connecting the tool support with the tractor and yieldingly resisting longitudinal movement of the tool support relative to the tractor, ground engaging gauge means connected with and movable relative to said tool support, means for connecting said gauge means with the tractor whereby rearward movement of the tool support, when it is connected with the tractor, effects a generally vertical movement of the gauge means relative to said tool support, and means connected with the tool support and adapted to be connected with the tractor and reacting against the tractor for raising said tool support, said raising means including connections which provide a lost motion connection when the raising means is in a lowered position, whereby the aforesaid vertical movement of the tool frame relative to the tractor, resulting from the yielding of said hitch means, is accommodated.

2. An agricultural implement adapted for use with a tractor having a power lift, comprising a tool frame, a cushion hitch for connecting the tool frame with the tractor, gauge wheel means movably connected with said tool frame for controlling the depth of operation of the tool means thereof, a hand lever connected with said gauge wheel, a sector to which the hand lever is normally connected, means connected with said sector whereby longitudinal movement of said tool frame relative to the tractor when said cushion hitch yields causes a depth adjusting movement of said sector and lever and hence said gauge wheel means, and means operatively connecting said tractor power lift with said tool frame for raising the latter, said last named means accommodating longitudinal movement of said tool frame.

3. An agricultural implement adapted for use with a tractor having a power lift, comprising a relatively wide tool frame, a cushion hitch for connecting the tool frame with the tractor, gauge wheel means movably connected with said tool frame at each side thereof for controlling the depth of operation of the tool means thereof, means including a hand lever for shifting each gauge wheel means, means whereby longitudinal movement of said tool frame relative to the tractor when said cushion hitch yields causes a depth adjusting movement of both of said hand lever means, the latter being adjustable to level said relatively wide tool frame, and means operatively connecting said tractor power lift with said tool frame for raising the latter, said last named means accommodating longitudinal movement of said tool frame.

4. An agricultural machine adapted to be connected with a tractor having a power lift, comprising a tool frame, tool means thereon, a pair of rock shafts mounted on said tool frame, a pair of gauge wheels, one connected with the outer end of each rock shaft, an arm fixed to the inner end of each rock shaft, means connecting both of said arms with said tractor power lift whereby operation of the latter acts through said arms and rock shafts for positioning said gauge wheels, and means having a lost motion connection with said power lift for raising both said tool frame and said gauge wheels.

5. An agricultural implement adapted to be connected with a tractor having a power lift operable through two ranges, one a depth adjusting range and the other a lifting range, said power lift including a transverse rock shaft on the tractor, said agricultural implement comprising a tool frame adapted to be hitched to the tractor, tool means carried by said tool frame, a pair of rock shafts on said tool frame, a gauge wheel connected with the laterally outer end of each rock shaft, an arm fixed to the laterally inner end of each rock shaft, a pair of arms, one connected to each end of said power lift rock shaft, a link connecting each power lift arm with the arm on the rock shaft at that side of the tool frame, whereby movement of said power lift arm means through said depth adjusting means serves to shift both of said gauge wheels, and means connecting both of said power lift arms through lost motion connections with said tool frame, whereby movement of said power lift through its lifting range serves to lift said tool frame, tool means and gauge wheels.

6. An agricultural machine adapted to be connected with a tractor having a power lift, comprising a tool frame, a rock shaft thereon, a gauge wheel connected with said rock shaft, means separate from said tool frame for connecting said rock shaft with said power lift, and manual means for adjusting said connection.

7. An agricultural machine adapted to be connected with a tractor having a power lift, comprising a tool frame, a pair of rock shafts mounted on said tool frame, a pair of gauge wheels, one connected with the outer end of each rock shaft, an arm connected to the inner end of each rock shaft, and means connecting both of said arms with said tractor power lift.

8. An agricultural machine adapted to be connected with a tractor having a power lift, comprising a tool frame adapted to be hitched at its forward end with the forward portion of the tractor and including a transverse tool bar extending transversely rearwardly of the rear wheels of the tractor, a pair of transversely disposed rock shafts rockably mounted, respectively, at the outer ends of said tool bar, brackets at the outer ends of said tool bar, gauge wheel crank axles journaled for generally vertical swinging movement on said brackets, respectively, and each having a gauge wheel, a second pair of brackets connected with said tool bar adjacent the ends, respectively, thereof, a bell crank mounted on each of said last mentioned brackets and a link connected with the associated gauge wheel crank axle, an arm fixed to the laterally outer end of each rock shaft and link connected with the associated bell crank at that side of the machine, a pair of lifting arms fixed to the power lift rock shaft, each lifting arm including two angularly related parts, means connecting one of said parts of each of said lifting arms with the tool frame, said means including lost motion means, and a link extending rearwardly from the other part of each of said lifting arms, and an arm fixed to the laterally inner end of each of said first mentioned rock shafts and pivotally connected with the associated link, rocking movement of the power lift rock shaft through one range acting through said links for swinging both of said first mentioned rock shafts and positioning said gauge wheels, continued movement of said power lift rock shaft serving to raise both said tool frame and said gauge wheels relative to the tractor.

9. An agricultural machine adapted to be connected with a tractor having a power lift, comprising a tool frame, a pair of rock shafts mounted on said tool frame, a pair of gauge wheels, one connected with the outer end of each rock shaft, a hand lever fixed to the inner end of each rock shaft, a sector rockably mounted on each rock shaft adjacent the associated hand lever and adapted to be connected with the latter optionally, and link means extending generally forwardly and connecting each of said sectors with the tractor power lift whereby operation of the latter acts through said hand levers and rock shafts for adjusting the position of said gauge wheels, each of said hand levers serving to adjust the individual position of the associated gauge wheel relative to the other gauge wheel.

10. The combination with a tractor having a power lift, of an agricultural implement having tool means and gauging means for adjusting the depth of operation of said tool means, means for connecting the implement with the tractor for longitudinal shifting movement, manual means for adjusting the position of the gauging means and acting against the tractor power lift normally holding said gauging means in its position of adjustment, and means also acting against said tractor power lift and operative by longitudinal movement of the implement for adjusting said gauging means.

11. An agricultural machine adapted to be connected with a tractor having a power lift, comprising a tool frame, tool means thereon, a pair of rock shafts mounted on said tool frame, a pair of gauge wheels, one connected with the outer end of each rock shaft, an arm fixed to the inner end of each rock shaft, means connecting both of said arms with said tractor power lift whereby operation of the latter acts through said arms and rock shafts for positioning said gauge wheels, and resilient means connecting said tool frame with the tractor and accommodating a rearward movement of said tool frame under abnormal pull, yielding of said resilient means and the resultant rearward movement of said tool frame acting through said connecting means and against the tractor power lift to shift said gauge wheels.

12. An agricultural machine adapted to be connected with a tractor having a power lift, comprising a tool frame, tool means thereon, a pair of rock shafts mounted on said tool frame, a pair of gauge wheels, one connected with the outer end of each rock shaft, an arm fixed to the inner end of each rock shaft, means connecting both of said arms with said tractor power lift whereby operation of the latter acts through said arms and rock shafts for positioning said gauge wheels, and means incorporated in the means connecting said arms with said power lift for shifting said rock shafts so as to provide an individual adjustment therefor independent of said tractor power lift.

13. An agricultural machine adapted to be connected with a tractor having a power lift, comprising ground working tool means, draft transmitting means connecting said tool means with the forward part of said tractor, means providing for movement of the forward part of said draft transmitting means relative to the tractor, means having a lost motion connection with said power lift for raising both said tool frame and said tool means, said lost motion connection accommodating a generally vertical movement relative to the tractor, and mechanism connecting said tool means with the tractor whereby rearward movement of said tool means, resulting from rearward movement of said draft transmitting means, shifts said frame and tool means, at least to the extent permitted by said lost motion means.

14. An agricultural implement comprising supporting frame means, tool means, yieldable hitch means providing for movement of the tool means longitudinally and independently of the supporting frame means, a power unit on said supporting frame means, means connecting said power unit with said tool means to move the latter generally vertically into and out of operating position, and including lost motion means accommodating an amount of generally vertical movement of said frame and tool means, and means responsive to rearward shifting of said frame and tool means for raising the latter generally vertically as permitted by said lost motion means.

15. An agricultural machine comprising propelling means, tool means resiliently connected with said propelling means and adapted to shift rearwardly generally longitudinally of the tractor in response to excessive draft forces, means on said propelling means having a lost motion connection with said tool means for raising the latter into a transport position, said lost motion connection providing for a limited amount of generally vertical movement of said tool means relative to said propelling means and said raising means thereon, ground engaging gauge means movably connected with said tool means, and means responsive to rearward shifting movement of said tool means relative to said propelling means and connected with said gauge means for raising said tool means relative to both said propelling means and said raising means for at least momentarily decreasing the depth of operation of said tool means when the latter is shifted rearwardly.

16. An agricultural implement comprising supporting frame means, tool means, yieldable hitch means providing for movement of the tool means longitudinally and independently of the supporting frame means, a power unit on said supporting frame means, means connecting said power unit with said tool means to move the latter generally vertically into and out of operating position, and including lost motion means accommodating an amount of movement of the tool means relative to said supporting means independent of said power unit, and means responsive to a generally longitudinal movement of the tool means relative to said supporting means for shifting the tool means generally vertically through the extent permitted by said lost motion means.

17. An agricultural implement comprising supporting frame means, a source of power thereon, tool means, yieldable hitch means providing for movement of the tool means longitudinally and independently of said supporting frame means, a pair of depth gauging means, a power unit on said supporting frame means deriving power from said source and including a lost motion connection with said tool means accommodating movement of the latter independent of said power unit, means connecting said power unit with the tool means to move the latter into and out of operating position, a pair of manually operable adjusting means connected between said power unit and said depth gauging means, and means whereby a longitudinal movement of said tool means acts through said depth adjusting means for effecting an adjustment in the depth of operation of said tool means within the extent permitted by said lost motion connection.

WALTER H. SILVER.